United States Patent
Klein et al.

(10) Patent No.: US 10,901,438 B2
(45) Date of Patent: Jan. 26, 2021

(54) FLOW SENSING TO IMPROVE SYSTEM AND DEVICE PERFORMANCE

(71) Applicant: Rachio, Inc., Denver, CO (US)

(72) Inventors: Christopher M. Klein, Denver, CO (US); Bradley W. Alcorn, Denver, CO (US)

(73) Assignee: RACHIO, INC., Denver, CO (US)

( * ) Notice: Subject to any disclaimer, the term of this patent is extended or adjusted under 35 U.S.C. 154(b) by 146 days.

(21) Appl. No.: 15/587,124

(22) Filed: May 4, 2017

(65) Prior Publication Data

US 2017/0322567 A1    Nov. 9, 2017

Related U.S. Application Data

(60) Provisional application No. 62/332,199, filed on May 5, 216.

(51) Int. Cl.
*G05D 7/06* (2006.01)
*A01G 25/16* (2006.01)

(52) U.S. Cl.
CPC ......... *G05D 7/0635* (2013.01); *A01G 25/165* (2013.01); *G05D 7/0664* (2013.01)

(58) Field of Classification Search
None
See application file for complete search history.

(56) References Cited

U.S. PATENT DOCUMENTS

| | | | | |
|---|---|---|---|---|
| 4,209,131 A * | 6/1980 | Barash | ................... | A01G 25/16 137/624.2 |
| 5,097,861 A * | 3/1992 | Hopkins | ................ | G05D 22/02 137/78.3 |
| 5,176,163 A * | 1/1993 | Al-Hamlan | ......... | A01G 25/162 137/119.06 |
| 5,229,937 A * | 7/1993 | Evelyn-Veere | ........ | A01G 25/16 700/284 |
| 5,583,790 A * | 12/1996 | Lan | ........................ | B67D 7/303 700/282 |
| 5,680,329 A * | 10/1997 | Lloyd | .................... | A62C 37/50 137/551 |
| 5,950,150 A * | 9/1999 | Lloyd | .................... | A62C 37/50 340/506 |
| 6,102,061 A * | 8/2000 | Addink | ................ | A01G 25/167 137/1 |
| 6,402,048 B1 * | 6/2002 | Collins | ..................... | B05B 3/02 239/210 |
| 6,950,728 B1 * | 9/2005 | Addink | ................. | A01G 25/16 137/78.2 |

(Continued)

*Primary Examiner* — Mohammad Ali
*Assistant Examiner* — Kelvin Booker
(74) *Attorney, Agent, or Firm* — Dorsey & Whitney LLP (57) ABSTRACT

In one embodiment, a method for optimizing downstream processes for a flow controller controlling various devices in a flow system is disclosed. The method includes receiving by a processing element historical data corresponding to flow characteristics for one or more flow devices controlled by the flow controller; evaluating by the processing element one or more current run settings based on the historical data; modifying by the processing element the one or more current run settings based on the historical data; and transmitting by the processing element the modified run settings to the flow controller to vary the operation of the one or more flow devices.

23 Claims, 7 Drawing Sheets

(56) References Cited

U.S. PATENT DOCUMENTS

| | | | |
|---|---|---|---|
| 9,360,871 B1* | 6/2016 | Jorgensen | F16K 37/0083 |
| 9,470,563 B1* | 10/2016 | DeVerse | A61B 5/02 |
| 9,684,312 B1* | 6/2017 | Eyring | F24F 11/62 |
| 10,317,306 B2* | 6/2019 | Saidi | G01M 3/26 |
| 10,362,739 B2* | 7/2019 | Ersavas | A01G 25/023 |
| 10,524,430 B1* | 1/2020 | Nervino | G01N 33/246 |
| 2001/0049563 A1* | 12/2001 | Addink | A01G 25/16 700/19 |
| 2003/0183018 A1* | 10/2003 | Addink | A01G 25/16 73/861.69 |
| 2003/0208306 A1* | 11/2003 | Addink | A01G 25/165 700/284 |
| 2004/0030456 A1* | 2/2004 | Barlow | A01G 25/165 700/284 |
| 2004/0039489 A1* | 2/2004 | Moore | A01G 25/16 700/284 |
| 2004/0064217 A1* | 4/2004 | Addink | G06Q 50/06 700/284 |
| 2005/0156067 A1* | 7/2005 | Ivans | A01G 25/16 239/723 |
| 2006/0063522 A1* | 3/2006 | McFarland | H04Q 9/00 455/423 |
| 2006/0063523 A1* | 3/2006 | McFarland | G08C 17/02 455/423 |
| 2006/0116792 A1* | 6/2006 | Addink | A01G 25/16 700/284 |
| 2006/0161309 A1* | 7/2006 | Moore | A01G 25/16 700/284 |
| 2007/0069850 A1* | 3/2007 | Anderson, Jr. | G05B 15/02 340/3.51 |
| 2008/0288116 A1* | 11/2008 | Nickerson | A01G 25/16 700/284 |
| 2010/0145530 A1* | 6/2010 | Nickerson | A01G 25/167 700/284 |
| 2010/0147389 A1* | 6/2010 | Blanchard | A01G 25/167 137/1 |
| 2011/0303310 A1* | 12/2011 | Klicpera | B05B 12/008 137/551 |
| 2011/0303311 A1* | 12/2011 | Klicpera | B05B 12/008 137/551 |
| 2012/0175425 A1* | 7/2012 | Evers | A01G 25/167 239/1 |
| 2012/0239211 A1* | 9/2012 | Walker | A01G 25/16 700/284 |
| 2012/0255706 A1* | 10/2012 | Tadayon | F28D 20/0039 165/47 |
| 2012/0298208 A1* | 11/2012 | Taylor | G05D 7/0635 137/2 |
| 2013/0060389 A1* | 3/2013 | Marsters | A01G 25/16 700/284 |
| 2013/0226357 A1* | 8/2013 | Ersavas | A01G 25/167 700/284 |
| 2014/0097367 A1* | 4/2014 | Burt | F24D 19/1015 251/129.04 |
| 2014/0129039 A1* | 5/2014 | Olive-Chahinian | A01G 25/16 700/284 |
| 2014/0222223 A1* | 8/2014 | Horton | A01G 25/16 700/284 |
| 2014/0236868 A1* | 8/2014 | Cook | G06Q 50/02 705/412 |
| 2014/0343736 A1* | 11/2014 | Meyer | G01M 3/18 700/283 |
| 2014/0365021 A1* | 12/2014 | Workman | A01G 25/16 700/284 |
| 2015/0032273 A1* | 1/2015 | Romney | A01G 25/16 700/284 |
| 2015/0075259 A1* | 3/2015 | Romney | A01G 25/165 73/40 |
| 2015/0077087 A1* | 3/2015 | Romney | A01G 25/165 324/76.11 |
| 2015/0081112 A1* | 3/2015 | Endrizzi | A01G 25/165 700/284 |
| 2015/0081114 A1* | 3/2015 | Romney | A01G 25/165 700/284 |
| 2015/0081117 A1* | 3/2015 | Romney | A01G 25/165 700/284 |
| 2015/0204701 A1* | 7/2015 | Klicpera | G01M 3/00 137/624.11 |
| 2015/0308084 A1* | 10/2015 | Thompson | E03C 1/057 700/283 |
| 2015/0319941 A1* | 11/2015 | Klein | A01G 25/162 700/284 |
| 2015/0351337 A1* | 12/2015 | Sabadin | A01G 25/16 700/282 |
| 2016/0037736 A1* | 2/2016 | Rainone | G05B 19/0428 700/284 |
| 2016/0076909 A1* | 3/2016 | Klicpera | G06Q 50/06 73/198 |
| 2016/0088807 A1* | 3/2016 | Bermudez Rodriguez | A01G 25/092 700/284 |
| 2016/0163177 A1* | 6/2016 | Klicpera | E03B 7/071 137/59 |
| 2016/0219804 A1* | 8/2016 | Romney | A01G 25/16 |
| 2016/0219805 A1* | 8/2016 | Romney | A01G 25/16 |
| 2016/0335875 A1* | 11/2016 | Alcorn | G01F 1/34 |
| 2017/0030798 A1* | 2/2017 | DeVerse | G06F 19/00 |
| 2017/0235317 A1* | 8/2017 | Cummings | G05B 15/02 700/282 |
| 2017/0314221 A1* | 11/2017 | Watson | E02B 7/34 |
| 2017/0318761 A1* | 11/2017 | Rainone | H04W 4/70 |
| 2018/0295797 A1* | 10/2018 | Klein | A01G 25/167 |
| 2019/0234786 A1* | 8/2019 | Klicpera | G01F 15/063 |
| 2019/0307084 A1* | 10/2019 | Ersavas | G05B 15/02 |

* cited by examiner

FLOW SENSING TO IMPROVE SYSTEM AND DEVICE PERFORMANCE

CROSS REFERENCE TO RELATED APPLICATIONS

The present disclosure claims priority to U.S. provisional application No. 62/332,199 entitled "Flow Sensing to Improve System and Device Performance," filed on May 5, 2016, which is hereby incorporated by reference herein in its entirety.

FIELD

The present disclosure relates generally to improving system and device performance of fluid flow devices and flow systems using detection of flow characteristics.

BACKGROUND

Smart watering systems, such as sprinkler controllers, often rely on a flow rate (e.g., gallons per minute) for a particular watering area in order to select watering times and schedules. However, in many instances, the flow rate is estimated for certain devices (e.g., sprinkler nozzle type, zone area, etc.) since real time tracking of the flow is not typically possible with current sprinkler systems. Estimations of flow rates does not provide accurate scheduling and also does not account for nor identify leaks, blockages, or malfunctions.

Further, current fluid-flow devices, such as sprinkler systems, dishwashers, washing machines, showerheads, faucets, toilets, and so on, are typically managed and monitored on an individual basis. Collective monitoring, such as that used by water or gas utilities to charge for services, is done by grouping all flow devices of a property together (e.g., all flow devices coupled to a main water line). This technique groups so many devices together making it difficult to identify inefficiencies in a particular system (e.g., leaks, malfunctions), as well as making it difficult to more accurately compare devices and properties for usage and historical trends.

SUMMARY

In one embodiment, a method for optimizing downstream processes for a flow controller controlling various devices in a flow system is disclosed. The method includes receiving by a processing element historical data corresponding to flow characteristics for one or more flow devices controlled by the flow controller; evaluating by the processing element one or more current run settings based on the historical data; modifying by the processing element the one or more current run settings based on the historical data; and transmitting by the processing element the modified run settings to the flow controller to vary the operation of the one or more flow devices.

In another embodiment, a method for optimizing downstream processes for a flow controller is disclosed. The method may include activating, by a processing element, a valve associated with a flow device controlled by the flow controller; determining, by the flow sensor, a current flow characteristic of the flow device; associating, by the processing element, a time stamp with the current flow characteristic of the flow device; determining, by the processing element, whether historical flow data associated with the flow device is available; and responsive to determining that historical flow data is available: comparing, by the processing element, the current flow characteristic with the historical flow data to identify a difference between the current flow characteristic and the historical flow data; and modifying, by the processing element, one or more settings for controlling the flow device based on the identified difference between the current flow characteristic and the historical flow data.

In yet another embodiment, a system for updating run settings for a flow controller is disclosed. The system includes a flow controller that controls fluid flow to a flow device based on current run settings; a flow sensor that measures one or more flow characteristics of the flow device; a memory that stores historical flow data associated with the flow device; and a processing element configured to execute program instructions that cause the processing element to: receive, from the memory, the historical flow data associated with the flow device; evaluate the current run settings based on the historical data; modify the current run settings based on the historical data; and transmit the modified run settings to the flow controller to vary the operation of the one or more flow devices.

In some embodiments, the one or more flow devices may include a plurality of sprinkler valves and the flow detector may detect the one or more flow characteristics of the sprinkler valves.

SPECIFICATION

Overview

In some embodiments herein, a system and method for using flow sensing to improve device performance and provide more accurate data monitoring is disclosed. In one embodiment, the system uses flow data from one or more devices that may be tracked by one or more flow sensors or through the flow devices themselves. The flow data is used to evaluate downstream decision processes, such as watering schedules, pricing plans, optimal run times, alerts, and so on, for one or more controlling devices (e.g., sprinkler controllers, utility water plants, main water supply controllers, etc.).

As one example, using flow data for two or more periods of time for a particular zone or device, the system can identify a leak, blockage, and/or pressure changes in the device or the zone. The system can then alert a user and/or utility to the blockage and can also adjust watering times or other factors in order to compensate for the leak or blockage before it is corrected. As another example, the system can track the actual gallons used during a period of time, such as a zone run, and then use the total gallon usage to budget water usage outdoors and correct or modify certain watering schedules. In other words, rather than just estimating the actual water use, the system can track and continuously update the system by providing dynamic feedback, which enhances the accuracy and can help to eliminate overwatering. Similarly, the system can capture the peak gallon-per-minute usage for a zone or device and use the peak use to determine a more accurate precipitation rate for the zone to use.

Using the system and method of the present disclosure the flow rate through any particular device can be used to improve the intelligence and decision making of the flow controller and other smart devices. For example, utility companies can track and compare outdoor water usage for multiple properties and can use this information to make informed decisions regarding pricing, flow controls, water budgeting, and the like. As another example, sprinklers in some locations may have a lower flow rate in reality than as estimated (e.g., due to variations in water pressure, nozzle clogging, or the like). In this example, the ground irrigated by these sprinklers may not receive the same water as other area and the system can vary the watering time for the particular zone to account for the lower flow rate through certain sprinklers.

Finally, the system and method allows for accurate flow information by location. Location may be determined by sprinkler placement, flow device placement, property placement, or the like. For example, a utility can pull information for all sprinkler controllers within a particular geographic area (e.g., neighborhood, latitude/longitude, etc.) and review the usage information for each of the sprinkler controllers in order to make adjustments in service, pricing, and the like.

It should be noted that many of the downstream processes analyses in light of historical data (e.g., flow control characteristics for select periods of time) may be done by a server, rather than locally on the specific devices. This allows the hardware on the flow controller and flow detector to be less robust and thus cheaper to manufacture and also allows easier integration of data across multiple devices and external sources.

The system may include one or more flow detection sensors, such as a flow detection hub, fluid source sensors, or the like. The flow detection hub detects fluid characteristics of fluid flow within a fluid system using one or more integral or main flow sensors, as well as a water quality sensor, one or more leak detectors, and one or more water source sensors. For example, a flow detector using one or more ultrasonic flow meters may be used to detect flow rates through a main water line. Using the detected fluid characteristics, the flow detection hub can determine whether a flow event, such as a leak or break, has occurred, as well as determining typical usage patterns and deviations from those patterns. The fluid characteristics and usage patterns can be transmitted to one or more user devices to alert users to leaks, breaks, as well as variations in typical usage. This allows users to be notified quickly when a leak or break occurs, as well as allows users to better and more easily monitor water usage within the system. An exemplary flow detection hub can be found in U.S. patent application Ser. No. 15/153,115 entitled "Detection of Flow Characteristics and Automatic Shutoff," which is hereby incorporated by reference herein in its entirety.

DETAILED DESCRIPTION

Figure 1:
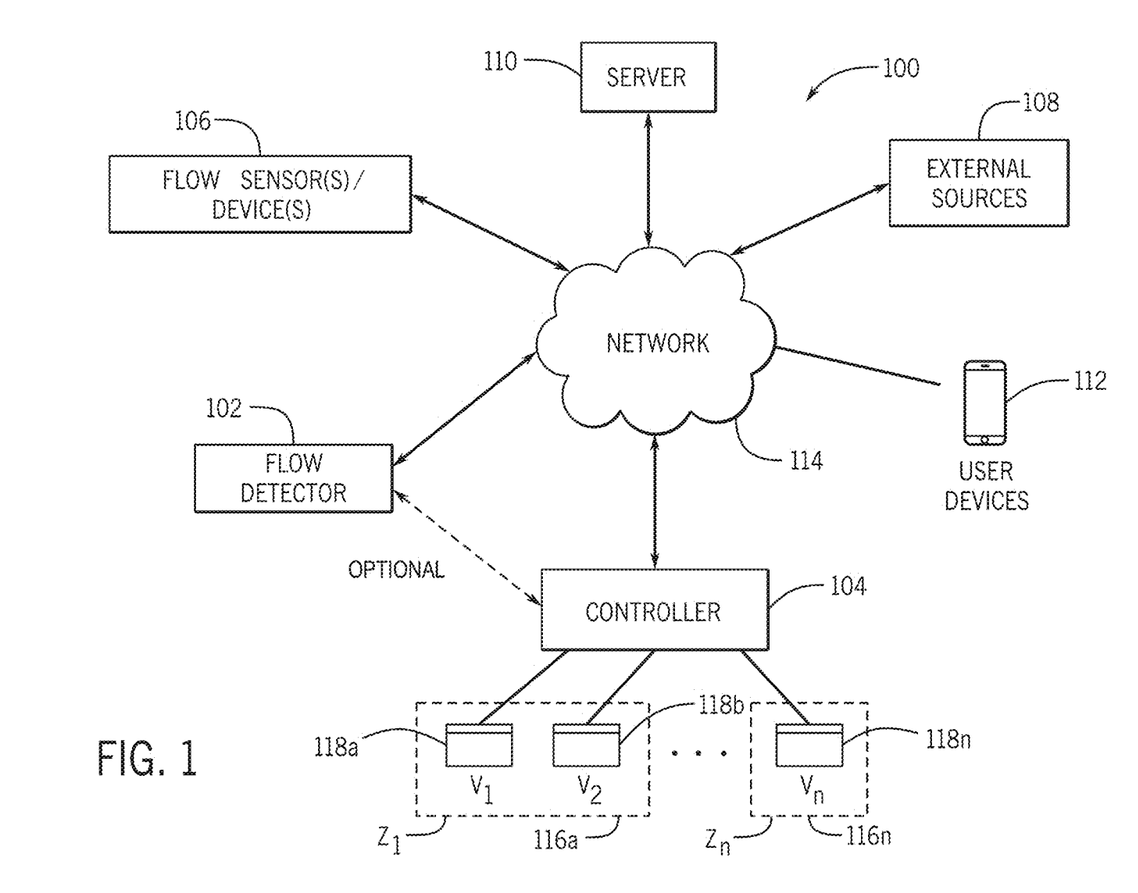
FIG. 1 is a block diagram of a system for improving performance of a flow controller controlling one or more flow devices in a flow system.

Turning now to the figures, the system of the present disclosure will be discussed in more detail. FIG. 1 is a block diagram illustrating an example of a flow sensing system 100. The system 100 includes a flow detector 102, a flow device controller 104, one or more flow sensors or devices 106, external flow sources 108, one or more servers 110, and one or more user devices 112. One or more of the various components of the system 100 (or data from those components) may be interconnected together and in communication with one another through a network 114. The network 114 may be substantially any type or combination of types of communication system for transmitting data either through wired or wireless mechanism (e.g., WiFi, Ethernet, Bluetooth, cellular data, or the like). In some embodiments, certain devices in the system 100 may communicate via a first mode (e.g., Bluetooth) and others may communicate via a second mode (e.g., WiFi).

The flow detector 102 detects flow characteristics of flow through a fluid system (e.g., house, condo, etc.) or through a particular device. The flow detector 102 may be used to determine flow data from one or more fluid sources (e.g., toilet, dishwasher, showerhead, sink, hose, etc.). The flow detector 102 then communicates flow characteristic and fluid system data to the other components in the system 100 through the network 114. The flow detector 102 in some embodiments is connected to a main supply line for a property or house to detect flow characteristics of water flow through the property, e.g., one or more ultrasonic flow meters, vibration flow sensors, or substantially any device that can track flow rate in a fluid lumen. The flow detector 102 may also include additional sensors, such as temperature, pressure, etc. that track additional characteristics of the fluid. In some embodiments, the flow detector 102 may be a water meter used by a utility company to track water or another commodity (e.g., natural gas). In some embodiments, the flow detector 102 may be a utility fluid meter that tracks flow at predetermined intervals or may constantly detect flow parameters.

The flow controller 104 is substantially any type of device that controls or regulates flow to one or more flow devices. In one embodiment, the flow controller 104 is a smart sprinkler controller that controls the operation of a plurality of sprinkler valves 118a, 118b, 118n in one or more watering zones 116a, 116n. An example of a sprinkler controller that may be used with the system 100 can be found in U.S. Publication No. 2015/0319941 filed on May 6, 2014 and entitled "Sprinkler and Method for an Improved Sprinkler Control System," which is incorporated by reference herein in its entirety. The sprinkler valves may be electronically operated, such as one or more solenoid valves, that open and close a flow path to a sprinkler head.

The flow sensors 106 are used to track the flow through one or more flow devices. The flow sensors 106 may be integrated into one more flow devices (e.g., showerheads, toilets, refrigerators/freezers, dishwashers, flow valves, or the like). For example, certain "smart home" devices may include one more sensors that track data corresponding the usage, e.g., a dishwasher may track its run time, flow rate, and the like and report this information to a controller 104 or to the network 114. Alternatively or additionally, the flow sensors 106 may be discrete sensors that are attached to the inlet or outlet of a fluid device. For example, the flow sensors 106 may detect vibrations in a fluid supply pipe into a device to detect flow into the device, such as by connecting around or to a pipe. As another example, the flow sensor 106 may be conductivity sensors to detect standing water, temperature sensors, or the like.

The external sources 108 are data and/or sensors from various devices or information hubs. The external sources 108 may include computing devices, such as servers, user devices, or the like, that include data on environmental factors (e.g., weather tracking), utility information (e.g., average water usage for a neighborhood or house, average water pricing rates, watering restrictions, water budgets, water availably in retention ponds or reservoirs, infrastructure costs etc.), smart home devices (e.g., smart thermostat, alarm system), or the like. The external sources 108 may be substantially any device or group of devices that provide environmental or external data that is relevant or correlates to the system 100.

The server 110 is a computing device that processes and executes information. The server 110 may include its own processing elements, memory components, and the like, and/or may be in communication with one or more external components (e.g., separate memory storage) (an example of computing elements that may be included in the server 110 is disclosed below with respect to FIG. 7). The server 110 may also include one or more server computers that are interconnected together via the network 114 or separate communicating protocol. The server 110 may host and execute a number of the processes performed by the system 100, the flow detector 102, and/or the flow controller 104. In some embodiments, each of the flow detector 102 and flow controller 104 may communicate with specialized servers 110 that communicate with a specialized system server 110 or each may communicate with the same server 110 or groups of servers.

The user devices 112 are various types of computing devices, e.g., smart phones, tablet computers, desktop computers, laptop computers, set top boxes, gaming devices, wearable devices, or the like. The user devices 112 are used to provide output and receive input from a user. For example, the server 110 may transmit one or more alerts to the user device 112 to indicate information regarding the flow controller 104 and/or flow detector 102. The type and number of user devices 112 may vary as desired and may include tiered or otherwise segmented types of devices (e.g., primary user device, secondary user device, guest device, or the like).

Figure 2:
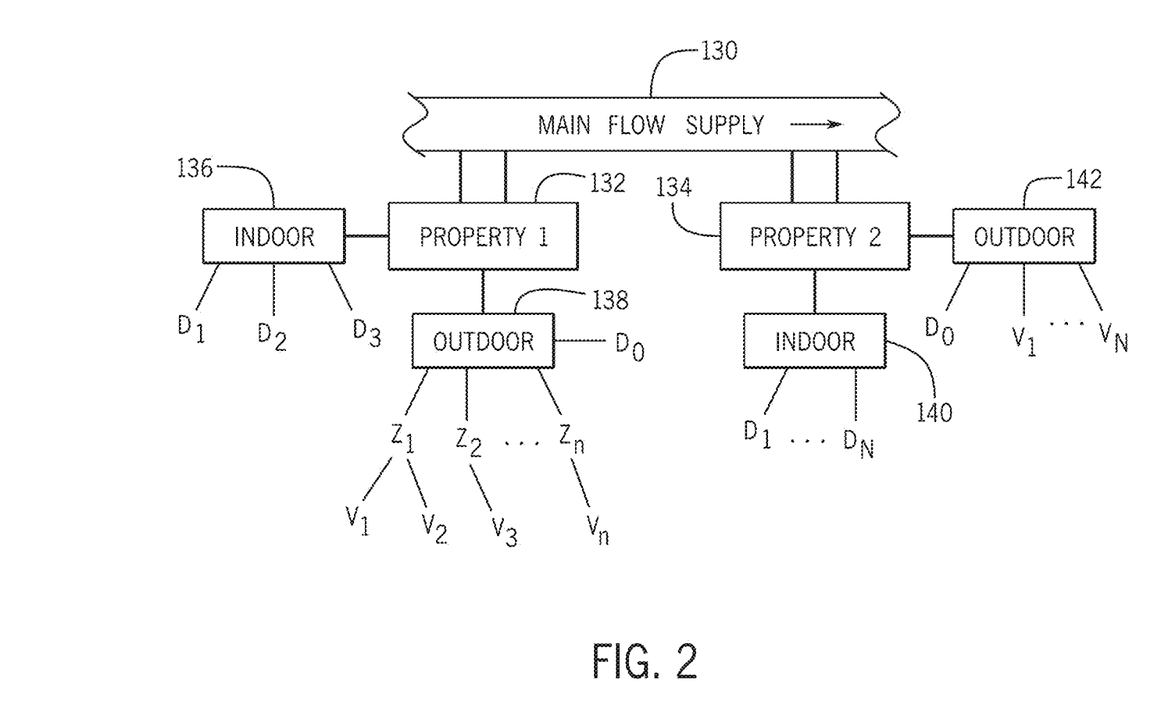
FIG. 2 is a simplified fluid flow diagram illustrating one implementation of the system of FIG. 1.

FIG. 2 is a simplified fluid flow diagram illustrating one implementation of the system 100. In some embodiments, the system 100 may be used to control and track the operation of multiple properties, e.g., a plurality of residential homes, an apartment or condominium complex, commercial complex (e.g., business park), or the like. In these embodiments, the system may communicate with multiple flow controllers 104 and/or flow detectors 102 for each of the various properties. With reference to FIG. 2, in this example, the system 100 may include two properties, a first property 132 and a second property 134. Each of the proprieties 132, 134 may include indoor flow sources 136, 140 and outdoor flow sources 138, 142. These flow sources 136, 138, 140, 142 may be connected to one or more flow controllers 104 and/or flow detectors 102. Additionally, each of the indoor flow sources 136, 140 may be fluidly connected to one or more flow devices that receive water from a main flow supply 130. In this example, the flow detector 106 for each property 132, 134 may detect the flow used by each of the devices specifically or may track the indoor use in general. Similarly, each of the outdoor flow sources 138, 142 may be in fluid communication with a plurality of sprinkler valves that water one or more zones, as well as one or more irrigator lines, hose outlets, and the like. The flow controller 104 may control operation of one or more of the outdoor flow sources (e.g., sprinkler valves) and/or may detect the usage and flow characteristics of each of the outdoor flow sources.

As noted above, each of the components of the system 100 communicate either directly or indirectly to provide output to the user device 112, as well as vary the operation of one or more flow devices and the flow controller 104. Examples of specific operations of the system 100 that are used to improve the performance and enhance the learning algorithms of the various components will be discussed in more detail below.

Figure 3:
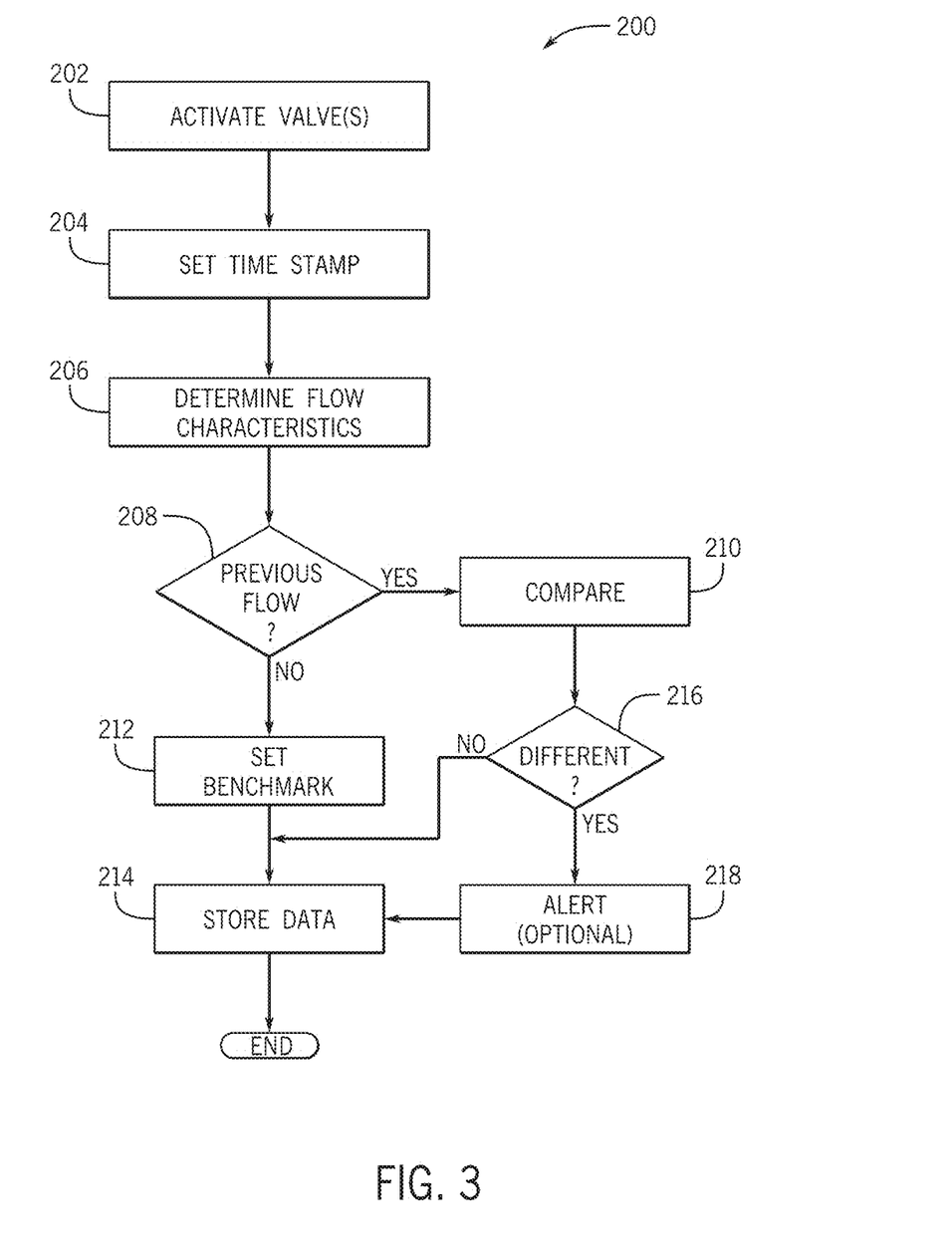
FIG. 3 is a flow chart illustrating a method for creating and storing flow characteristic data that can be used by the system of FIG. 1 to improve downstream processes.

A method for creating and storing flow characteristic data that can be used by the system 100 to improve downstream processes is shown in FIG. 3. With reference to FIG. 3, the method 200 may begin with operation 202 and the flow controller 104 activates one or more flow devices, e.g., one or more sprinkler valves 118, that begin to output water. As the flow devices are activated, the method 200 may proceed to operation 204 and a time stamp indicating the time that the flow devices were switched on is generated. The time stamp may be generated by the flow controller 104, by the flow detector 102, or the server 110. In many embodiments, the time stamp is generated by the flow controller 104 as it activates the particular flow device.

After operation 204, the method 200 may proceed to operation 206 and one or more flow characteristics of the flow device are determined. The flow characteristics may include one or more of the following: flow rate, temperature, pressure, frequency, or the like. The flow characteristics may be determined by detecting the flow through the flow device by the flow detector 102, the flow sensor 106, the external sources 108, and/or the controller 104 itself. In many embodiments the flow characteristics may include at least one parameter that is sensed or determined directly (e.g., flow rate), rather than being estimated, which will provide more accurate downstream processing as discussed in more detail below.

With continued reference to FIG. 3, after operation 206, the method 200 may proceed to operation 208. In operation 208, the system 100 may determine if there has been previous flow characteristic information related to the flow from the activated flow device. For example, the system may evaluate whether a similar device in a similar location or property has been activated recently. As another example, the system may evaluate whether the activated flow device has been recently activated. The previous flow may be with respect to the system, similar flow devices, the same flow devices, or the like, and may span various periods of time (e.g., in the last few minutes, hours, days, weeks, months, or years). Past flow characteristics may be identified based on time stamps associated with past activated flow devices.

If there has been previous flow, the method 200 may proceed to operation 210, and the data from the current flow (e.g., the current flow characteristics) are compared with one or more of the previous flow data (e.g., past flow characteristics). This comparison may be with respect to any number of factors or characteristics. During the compare operation 210, the method 200 proceeds to operation 216 and the processing element assesses whether the flow characteristics are different. For example, the current flow rate may be compared with a past flow rate through the flow device in order to determine if the flow rate has increased or decreased, which may be indicative of one or more problems with the system, such as a leak or a blockage. If the flow characteristics are different, the method 200 may proceed to operation 218 and an alert may be provided to the user. For example, the system 100 may determine that the flow characteristics for a particular flow device or set of devices (e.g., one or more sprinkler valves) is different from the previous flow earlier in the week. In this case, the system 100 may provide an alert to the user device 112 to indicate that there may be a leak, a malfunction, or the like with the particular flow device or devices. As another example, the system 100 may compare a showerhead usage and may determine that the flow time exceeds the previous morning and may text an alert to the user device 112 that a person may be taking a very long shower or that the shower appears to be running for an extended period of time.

If in operation 216, the flow is not different, the method 200 may proceed to operation 214 and the data may be stored in one more memory components either on the flow controller 104, the flow detector 102, or in the cloud (e.g., server 110). These stored data may then be provided as past data for the flow device during a future iteration of the method 200.

With reference to FIG. 3, if in operation 208, there has not been previous flow, the method 200 may proceed to operation 212 and the system 100 may set a benchmark or other data point indicating the flow characteristics for that time, e.g., time stamp, flow rate, temperature, or the like. Once the benchmark has been determined, the method 200 may proceed to operation 214 and the benchmark data may be stored in the same manner as described above.

Figure 4:
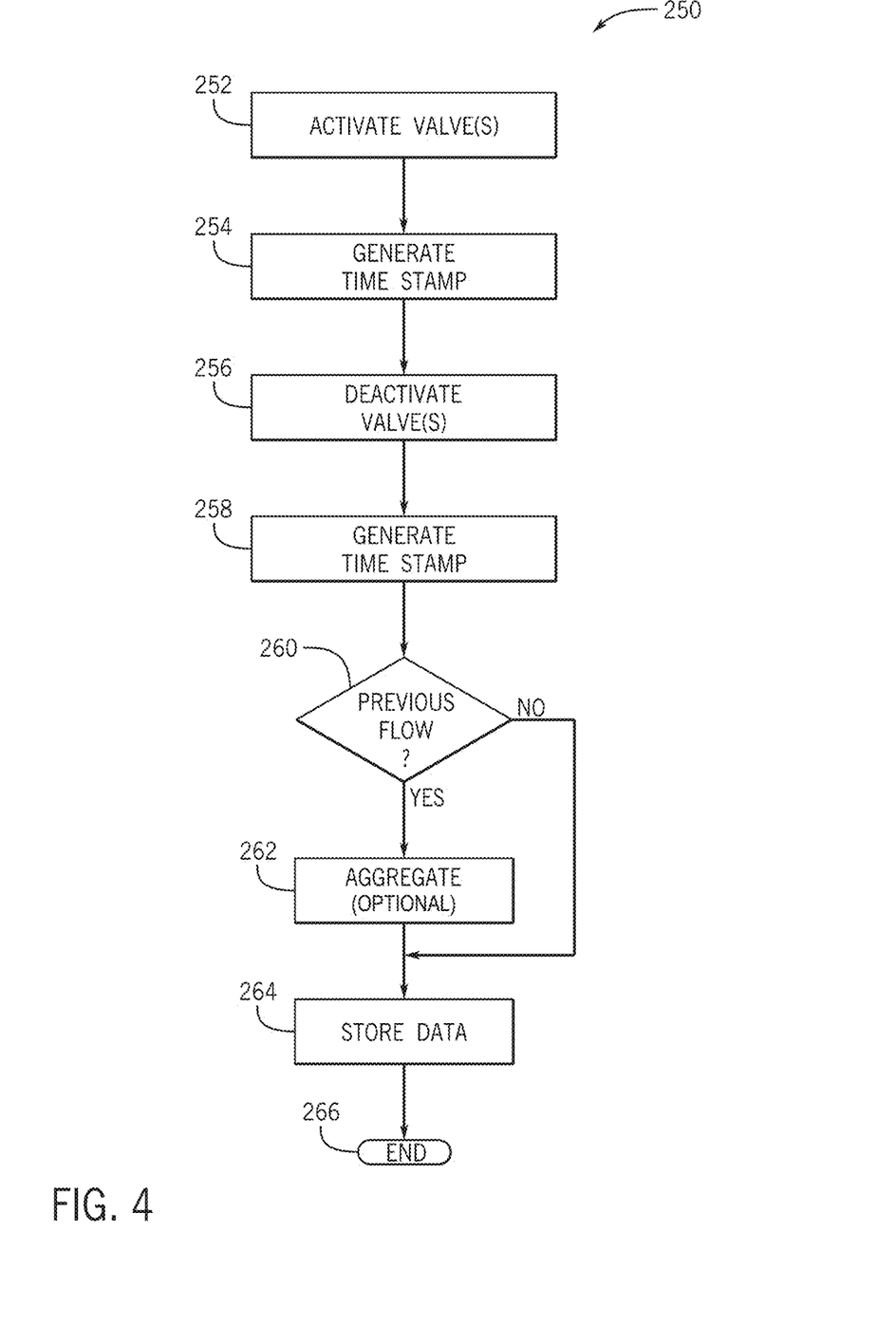
FIG. 4 is a flow chart illustrating another method for creating and storing flow characteristic data that can be used by the system of FIG. 1 to improve downstream processes.

FIG. 4 is a flow chart illustrating another example of a method 250 for capturing and storing data that may be used to modify downstream processes of the system 100. With reference to FIG. 4, the method 250 may begin with operation 252, and one or more flow devices are activated, e.g., one or more valves 118a, 118b, 118n, are activated by the controller 104 to begin flow. In one embodiment, multiple valves 118a, 118b in one zone 116a, 116n are activated at the same time and the system 100 will capture information corresponding to the select zone, rather than the specific valve. However, in other embodiments, the valves may be activated one by one to allow data to be collected corresponding to the specific valve. Thus, the granularity of data collection may be adjusted to best suit the particular environment in which method 250 is being executed.

After the flow device has been activated, the method 250 may proceed to operation 254 and a time stamp corresponding to the activation time is generated. The time stamp may be stored in the controller 104, the flow detector 102, and/or the server 110. While the one or more flow devices are activated, flow data may be collected about the one or more flow devices. For example, the flow sensors 106, the flow detector 102, the controller 104 and/or the external sources 108 may measure and collect flow data related to the flow device, such as temperature, pressure, flow rate, etc. This may occur each time a flow device is activated or a flow is detected by the system.

The method 250 then may proceed to operation 256 and the flow controller 104 may deactivate the one or more flow devices, e.g., turn off the valves in the activated zone 116a, 116n, or turn off the select valves 118a, 118b, 118n. For example, the controller 104 may transmit as signal to one or more electronic valves (e.g., solenoid valves) that close the outlet for the flow device.

After or as the flow devices are deactivated, the method 250 may proceed to operation 258 and a time stamp is generated. This operation may be substantially the same as operation 254 and the time stamp indicates the time that the flow device was deactivated and optionally may include additional data such as the flow rate, temperature, pressure, and other flow characteristics detected by the flow detector 102 during the activation. The time stamp may be stored by the flow detector 102, the controller 104, and/or by the server 110.

After operation 258, the method 250 may proceed to operation 260 and the system 100 determines whether there was previous flow. This operation may be substantially similar to 208 in FIG. 3. Previous flow may be defined in a number of manners and may be based on the particular flow device, the overall flow system, similar systems or devices (e.g., all showerhead flows in the last two days), or the like. If there has been previous flow correlated to or related to the activated flow device, the method 250 may proceed to operation 262 and the system 100 may aggregate the flow data together. For example, the system 100 may generate a chart or data points that indicate the past and current flow characteristics of a particular flow device, multiple flow devices, and/or the system 100. The data may be aggregated in a number of different manners to enable the system 100 to identify trends, patterns, and the like.

After operation 262, or if in operation 260 there has not been previous flow, the method 250 may proceed to operation 264 and the data (e.g., the data points for the activated flow device(s) and/or the aggregated data) is stored by the system 100. The method 250 may then proceed to an end state 266.

Figure 5:
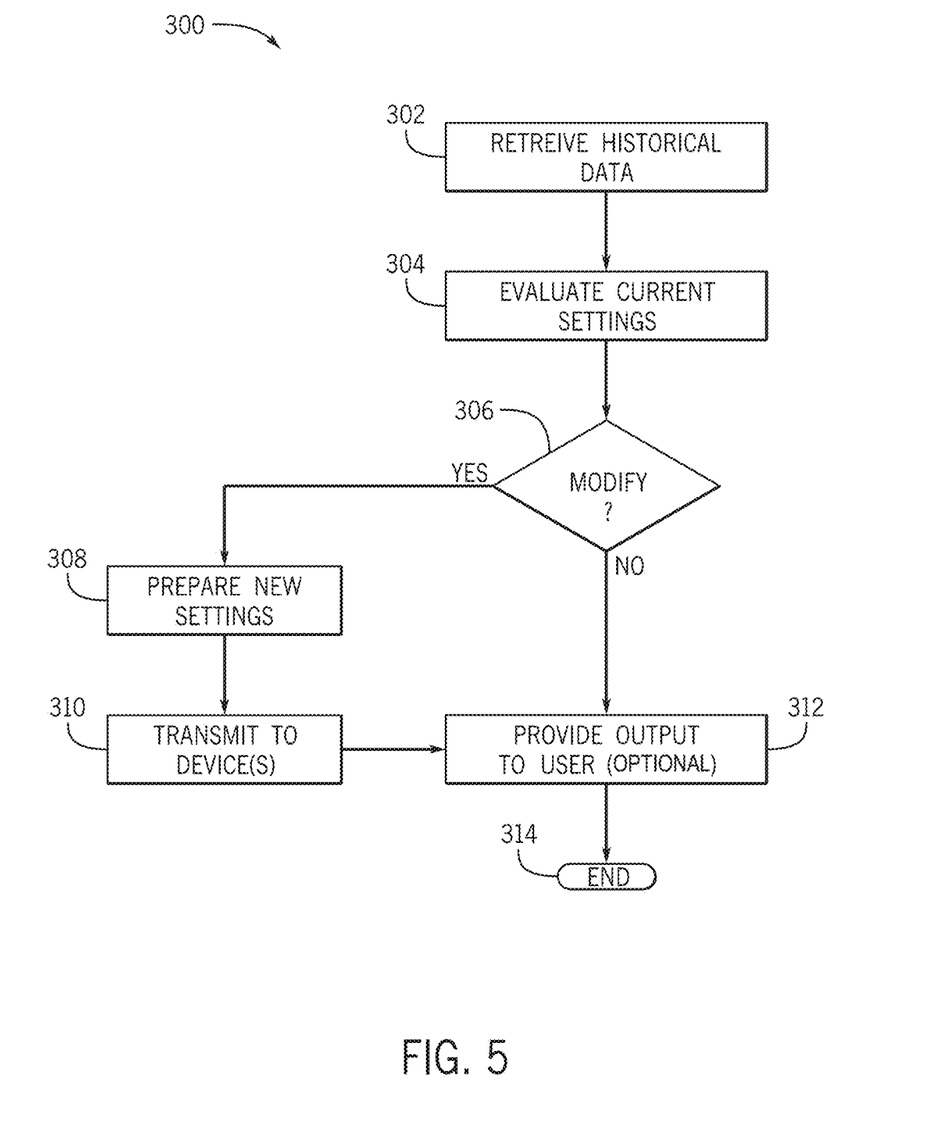
FIG. 5 is a flow chart illustrating a method for using flow characteristic data to modify and improve downstream processes for a flow controller.

Using the data from methods 200, 250, the system 100 is able to modify downstream processes and incorporate intelligent learning into the various algorithms for controlling and operating various flow devices within the system 100. FIG. 5 is a flow chart illustrating a method 300 that may be used to improve flow device performance using historical data. With reference to FIG. 5, the method 300 may begin with operation 302 and the decision making unit (e.g., server 110 and/or flow controller 104) retrieves historical data from the memory. In one embodiment, the server 110 may retrieve historical data corresponding to the flow system and the various flow devices from memory. In another embodiment, the controller 104 may retrieve historical data either from one or more devices coupled to the network 114 and/or internal memory storage.

With reference to FIG. 5, after operation 302, the method 300 may proceed to operation 304 and the system 100 evaluates the current settings of the flow controller 104. For example, the server 110 may review the parameters corresponding to a watering schedule for one or more zones 116a-116n in light of the historical data corresponding to the actual flow characteristics of the flow devices in those zones 116a-116n (e.g., valves 118a, 118b, . . . , 118n), environmental factors, as compared to other properties having similarity zones (e.g., compare the first property 132 to the second property 134), or the like. As another example, the server 110 may compare the watering schedule (e.g., number of times a week, length of time, area coverage, etc.) with related properties in similar locations. As another example, the controller 104 may compare the flow pressure of each valve 116a, 116b in a first zone 118a as compared to the valve 116n in a second zone 118n during run time. The result of the evaluation of operation 304 may be one or more differences, discrepancies, patterns, or other anomalies indicative of inconsistent, sub-optimal, or inefficient flow characteristics of one or more flow devices.

After operation 304, the method 300 may proceed to operation 306 and the server 110 or controller 104 may determine whether to modify the current flow settings based on the historical data. For example, the controller 104 may determine that the flow rate for a particular zone 118a, 118n is higher than calculated (e.g., the actual flow rate exceeds the estimated flow rate) and in this example may want to modify the watering settings to reduce the on-time for the zone in order to prevent over-watering and comply with government water conservation standards. As another example, the controller 104 may determine that a particular zone 118a, 118n corresponds to a large drop in water pressure due to multiple valves 116a, 116b, 116n being operated at the same time and may revise the zone settings for the controller 104 to reduce the number of valves operating during the particular zone time.

As yet another example, a utility company may review the historical data and determine that the outdoor usage 138 of the first property 132 far exceeds the outdoor use 142 of the second property 134 and/or the average of properties in a particular location. Based on this, the utility company may decide to modify the price settings for the first property 132 or otherwise vary the service provided to the first property 132. In this embodiment, the utility company may compare the sprinkler systems of each property to one another and remove the other water sources to identify an inefficient sprinkler system. As another example, the utility companies can compare water usage for showering devices to indicate whether the showerheads comply with government standards. This type of individual flow device tracking and comparison is not possible with conventional utility water meter devices.

In other examples, utility companies may use flow data to set water budgets, either on a per property basis or on a larger scale (e.g., neighborhood, city), based on available water that can be used outdoors (e.g., potable, reclaimed or gray) by residents. Additionally, higher prices could be set for watering outside of allotted budgets, which could be based on size of property and zone characteristics, so that the budgets are unique to the customer. Using the disclosed method, the system may determine the optimal amount of water needed for a particular property type and zone and set the water budget based on this, allowing the budget to account for types of soil, vegetation, sprinkler types, and the like. The utility may then monitor the flow to ensure compliance with the budget.

If in operation 306, the settings or downstream processes of the flow controller 104 are not to be modified, the method 300 may proceed to operation 312. In operation 312 the system 100 may optionally decide to provide an alert to the user device 112 that either the settings did or did not change. In some embodiments, the alert may only be sent when there is a change, but in other embodiments, an alert may be sent when there is new data that is reviewed and no change is being made. In some embodiments, the user may provide input agreeing to the change before the change is implemented.

If in operation 306, the settings are to be modified, the method 300 may proceed to operation 308. In operation 308, the server 110 and/or the flow controller 104 prepare new settings and downstream processes for the controller 104. For example, the server 110 modifies a watering schedule based on the discrepancies noted during operation 306. The new settings may apply to a single flow device, multiple devices, and/or the entire system 100. When the new settings are prepared or generated by the server 110, the method 300 may proceed to operation 310 and the settings may be transmitted to the one or more devices (e.g., flow controller 104) or in certain instances may be transmitted to the specific flow devices themselves.

After operation 310 or 306, the method proceeds to 312, which as described above may transmit one or more alerts or messages to the user device 112. After operation 312, the method 300 may proceed to an end state 314.

Figure 6:
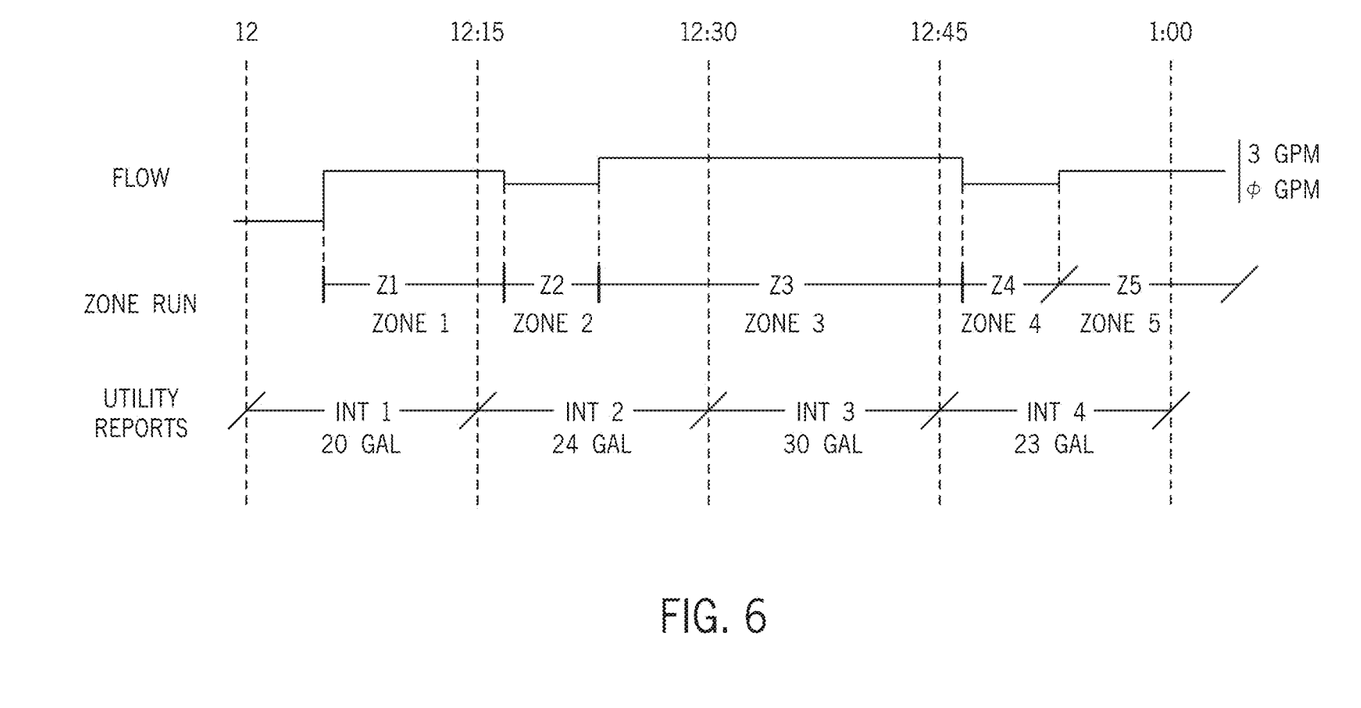
FIG. 6 is a graph illustrating fluid flow data as compared to zone run times and utility flow meter intervals.

In some embodiments, the system 100 may use a utility water meter as the flow detector 102 or may otherwise use a main water line flow detector where it may be difficult to assess flow characteristics from various devices. In these embodiments, the flow detector 102 may detect flow rates only at predetermined intervals, e.g., every 15 minutes, once a day, or the like. Accordingly, the flow characteristic data may not be easily correlated with specific flow devices, such as specific zones, valves, or the like. For example, as shown in FIG. 6, during a run time of five different zones, each interval may capture only a portion of flow from a particular zone (e.g., intervals 1 and 3), may capture flow from two different zones (e.g., intervals 2 and 4), or the like, and so the flow characteristic data cannot be directly correlated to a particular zone. The correlation is even more difficult where additional flow devices (e.g., showers) may be operating at the same time as the zones.

In this embodiment, the system 100 may set the zone run time to match the interval time for the flow detector 102. For example, for at least a calibration period, each zone may operate during the designated interval time, starting and stopping at substantially the same time as the reading intervals of the flow detector 102. In this example, the server 110 can then correlate the flow data detected with a particular zone. For zones that include watering times that extend for two intervals, the zone could be activated during two intervals and the data combined together.

However, in many embodiments, the correlation may be too difficult to efficiently implement, e.g., utility metering intervals may not be known, may not align with zone times, or the like. In these embodiments, the system 100 can implement varying zone start times in order to determine a correlation. For example, the run time of a particular zone will change to cover different time intervals (e.g., zone 1 may be activated during interval 1 on Monday and activated at interval 4 on Friday), which will provide additional data points that can use to further correlate the detected flow characteristics with the zones. Without adapting the zone times and or using other learning techniques, the system 100 may not accurately correlate flow rates with a particular zone and thus may not detect issues with the system as quickly or accurately.

Figure 7:
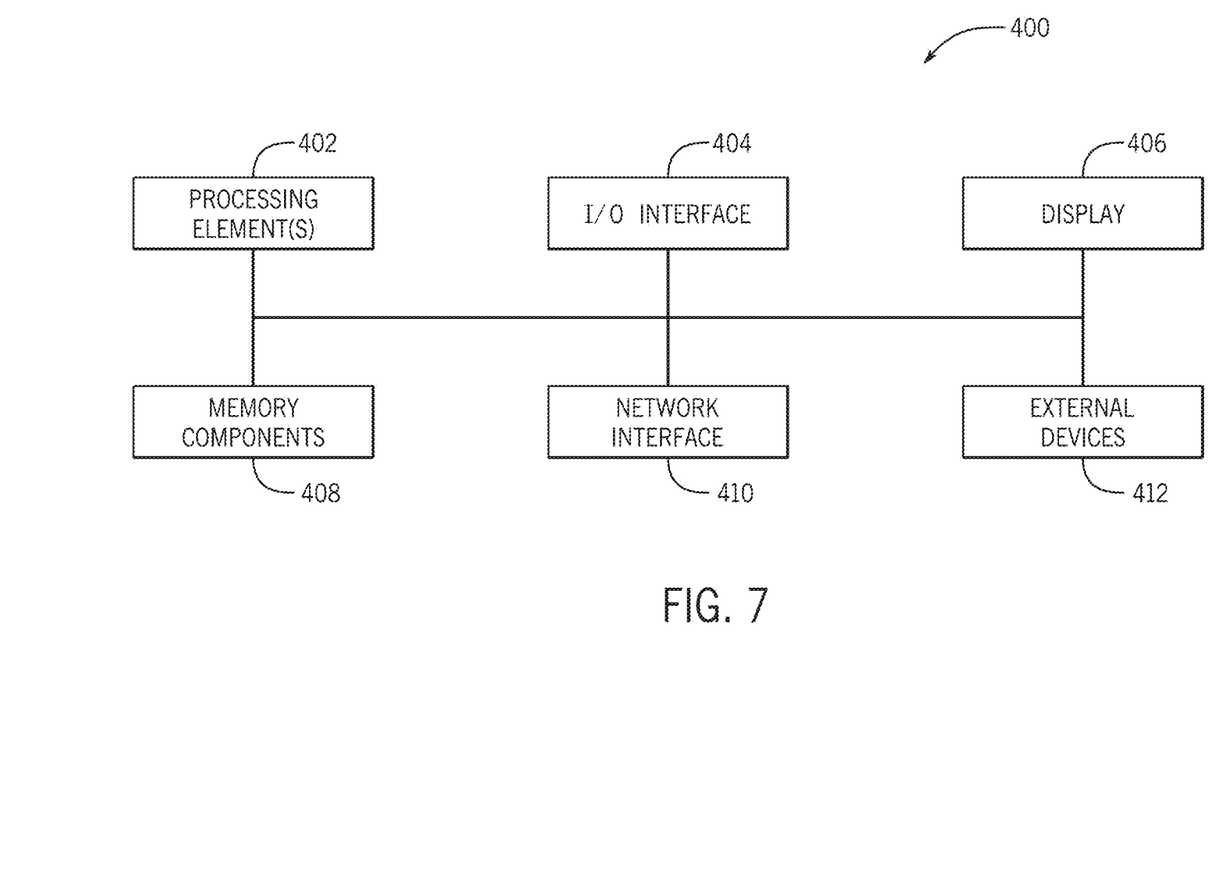
FIG. 7 is a simplified block diagram of a computing device that may be incorporated into one or more of the components in the system of FIG. 1.

A simplified block structure for a computing device that may be used with the system 100 or integrated into one or more of the system 100 components is shown in FIG. 7. For example, the server 110, user device 112, flow detector 102, and/or controller 104 may include one or more of the components shown in FIG. 7 and be used to execute one or more of the operations disclosed in methods 200, 250, 300. With reference to FIG. 7, the computing device 400 may include one or more processing elements 402, an input/output interface 404, a display 406, one or more memory components 498, a network interface 410, and one or more external devices 412. Each of the various components may be in communication with one another through one or more busses, wireless means, or the like.

The processing element 402 is any type of electronic device capable of processing, receiving, and/or transmitting instructions. For example, the processing element 402 may be a microprocessor or microcontroller. Additionally, it should be noted that select components of the computer 400 may be controlled by a first processor and other components may be controlled by a second processor, where the first and second processors may or may not be in communication with each other.

The memory components 408 are used by the computer 400 to store instructions for the processing element 402, as well as store data, such as the fluid device data, historical data, and the like. The memory components 408 may be, for example, magneto-optical storage, read-only memory, random access memory, erasable programmable memory, flash memory, or a combination of one or more types of memory components.

The display 406 provides visual feedback to a user and, optionally, can act as an input element to enable a user to control, manipulate, and calibrate various components of the computing device 400. The display 406 may be a liquid crystal display, plasma display, organic light-emitting diode display, and/or cathode ray tube display. In embodiments where the display 406 is used as an input, the display may include one or more touch or input sensors, such as capacitive touch sensors, resistive grid, or the like.

The I/O interface 404 allows a user to enter data into the computer 400, as well as provides an input/output for the computer 400 to communicate with other devices (e.g., flow controller 104, flow detector 102, other computers, speakers, etc.). The I/O interface 404 can include one or more input buttons, touch pads, and so on.

The network interface 410 provides communication to and from the computer 400 to other devices. For example, the network interface 410 allows the server 110 to communicate with the flow controller 104 and the flow detector 102 through the network 114. The network interface 410 includes one or more communication protocols, such as, but not limited to WiFi, Ethernet, Bluetooth, and so on. The network interface 410 may also include one or more hard-wired components, such as a Universal Serial Bus (USB) cable, or the like. The configuration of the network interface 410 depends on the types of communication desired and may be modified to communicate via WiFi, Bluetooth, and so on.

The external devices 412 are one or more devices that can be used to provide various inputs to the computing device 400, e.g., mouse, microphone, keyboard, trackpad, or the like. The external devices 412 may be local or remote and may vary as desired.

CONCLUSION

The foregoing description has broad application. For example, while examples disclosed herein may focus on residential water systems, it should be appreciated that the concepts disclosed herein may equally apply to other water systems, such as commercial properties. Similarly, although the system is discussed with respect to water sources, the system and methods may be used with substantially any other type of fluid systems. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. A method for optimizing downstream processes for a flow controller comprising:
   detecting by a flow detector a current fluid flow condition for one or more flow devices during a watering run time of a watering schedule for the one or more flow devices, wherein the one or more flow devices are controlled by the flow controller and are associated with a property;
   determining by a processing element an amount of water used by the one or more flow devices during the watering run time based on the detected current fluid flow condition;
   comparing by the processing element the amount of water used to an expected amount of water used by the one or more flow devices, the expected amount of water used being based on an estimated flow condition of the one or more flow devices or on historical data corresponding to a past fluid flow condition for the one or more flow devices;
   modifying by the processing element the watering schedule for the one or more flow devices to increase or decrease length of watering time for one or more future watering run times when the amount of water used deviates from the expected amount of water used; and
   transmitting by the processing element the modified watering schedule to the flow controller to vary the operation of the one or more flow devices.

2. The method of claim 1, wherein the one or more flow devices comprise a plurality of sprinkler valves.

3. The method of claim 1, further comprising associating a time stamp with the current fluid flow condition.

4. The method of claim 3, wherein the time stamp is generated when the one or more flow devices are activated.

5. The method of claim 4, wherein the historical data comprises a time stamp associated with the past fluid flow condition and past activation of the one or more flow devices.

6. The method of claim 1, wherein comparing the amount of water used with the expected amount of water used comprises identifying one or more differences between the current fluid flow condition and the past fluid flow condition for the one or more flow devices.

7. The method of claim 1, further comprising transmitting by the processing element an alert to one or more user devices responsive to transmitting the modified run settings to the flow controller.

8. The method of claim 1, wherein the one or more flow devices are positioned within a particular zone of the property.

9. The method of claim 1, wherein the historical data comprises a detected actual fluid flow condition corresponding to the one or more flow devices stored when no previous detected fluid flow condition has been stored or when the detected actual fluid flow condition fails to deviate from a stored detected fluid flow condition.

10. A method for optimizing downstream processes for a flow controller comprising:
- activating, by a processing element, a valve associated with a particular flow device controlled by the flow controller;
- determining, by the flow sensor, a current fluid flow condition of the particular flow device;
- associating, by the processing element, a time stamp with the current fluid flow condition of the particular flow device;
- determining, by the processing element, whether historical flow data associated with the particular flow device is available, wherein the historical flow data comprises data on a previous fluid flow condition of the particular flow device; and
- responsive to determining that historical flow data is available:
  - comparing, by the processing element, the current fluid flow condition with the historical flow data to identify a difference between the current fluid flow condition and the historical flow data; and
  - increasing or decreasing, by the processing element, a watering time length for a watering schedule of the particular flow device based on the identified difference between the current fluid flow condition and the historical flow data, such that the amount of water delivered by the flow device during the watering time length equals a desired water volume delivered by the flow device used to set the watering schedule.

11. The method of claim 10, further comprising:
- aggregating the current fluid flow condition with the historical flow data based on the time stamp to generate updated historical flow data; and
- storing the updated historical flow data in a memory component.

12. The method of claim 10, further comprising:
- transmitting, by the processing element, a notification to a user device indicative of the modified one or more settings.

13. The method of claim 10, wherein determining the current fluid flow condition comprises:
- measuring, by the flow sensor, fluid flow conditions of the particular flow device during a plurality of intervals during which the particular flow device is activated.

14. The method of claim 10, wherein the particular flow device comprises an indoor flow device, an outdoor flow device, or a combination thereof.

15. The method of claim 14, wherein the particular flow device comprises one or more sprinklers that provide water to one or more associated watering zones.

16. The method of claim 10, further comprising:
- responsive to determining that historical flow data is not available:
  - setting, by the processing element, a benchmark based on the current fluid flow condition; and
  - storing the benchmark in a memory component.

17. The method of claim 10, further comprising:
- deactivating, by a processing element, the valve associated with the particular flow device controlled by the flow controller; and
- associating, by the processing element, a second time stamp with the current fluid flow characteristic of the particular flow device, wherein the second time stamp is indicative of a time at which the valve is deactivated and the time stamp is indicative of a time at which the valve is activated.

18. A system for updating run settings for a flow controller comprising:
- a flow controller that controls fluid flow to a flow device of a property using current run settings based on an estimated fluid flow condition;
- a flow sensor that measures one or more current fluid flow conditions of the flow device during a watering time length;
- a memory that stores historical flow data associated with the flow device, wherein the historical flow data comprises past fluid flow data collected and stored for the flow device; and
- a processing element configured to execute program instructions that cause the processing element to:
  - receive, from the memory, the historical flow data associated with the flow device;
  - compare the one or more current fluid flow conditions with the historical flow data and the estimated fluid flow condition;
  - evaluate the current run settings based on the comparison;
  - modify the current run settings to increase or decrease a watering on-time when the one or more current fluid flow conditions deviate from one of the historical data or the estimated fluid flow conditions, such that the amount of water delivered by the flow device during the watering time length equals a desired water volume used to determine the current run settings; and
  - transmit the modified run settings to the flow controller to vary the operation of the flow device.

19. The system of claim 18, wherein the flow controller, flow sensor, memory, and processing element are all coupled over a network.

20. The system of claim 18, wherein the flow controller is configured to selectively activate and deactivate a valve to control fluid flow to the flow device.

21. The system of claim 18, wherein the flow device comprises one or more sprinklers that provide water to one or more watering zones within the property.

22. The system of claim 18, wherein the flow sensor comprises an ultrasonic flow meter, a vibration flow sensor, a conductivity sensor, a thermometer, or a combination thereof.

23. The system of claim 18, wherein the flow controller further controls fluid flow to the flow device based on the modified run settings.

* * * * *